Patented Oct. 11, 1938

2,133,064

UNITED STATES PATENT OFFICE 2,133,064

COLORATION OF FRUIT

David G. Ulrey, Tampa, Fla., assignor to H. Grady Zellner, Lakeland, Fla.

No Drawing. Application July 29, 1936, Serial No. 93,311

3 Claims. (Cl. 99—103)

This invention relates to the coloration of fruit, more particularly to an improved method of treating citrus fruits to enhance their varietal color.

It is well known in the art that the color of fruits, especially citrus fruits, is one of the more important factors which govern the price of such products. In view of this it has been proposed in the past to enhance the varietal color of citrus fruits, such as oranges, by applying a dye thereto. One commercial method which has been employed consists essentially in dissolving a water insoluble, oil soluble dye in a relatively strong non-aqueous solvent and applying this vehicle, consisting of the solubilized dye, to the fruit. When the fruit is contacted with such a dye bath the solvent, having a solubilizing action upon the oily and waxy constituents of the skin, tends to dissolve these and ultimately to deposit the dye in the peel of the fruit.

A disadvantage of this older method is that the fruit is contacted with a relatively large quantity of the solvent vehicle for a protracted period of time. Due to this the solvent tends to solubilize and extract or leach out a considerable quantity of the natural preserving agents of the fruit, namely the waxes and/or oils.

The object of the present invention is to provide a process of treating fruit to accentuate or enhance its natural color without too great a removal of the natural oleaginous preserving agent.

Another object is to provide an improved method of coloring citrus fruits.

A further object is to provide a method for coloring citrus fruits whereby a dye is dissolved in a vehicle coating on the surface of the fruit.

A still further object is to provide an improved method of coloring citrus fruit whereby a water insoluble, oil soluble dye is dissolved in situ on the peel of the fruit.

With these and other equally important and related objects in view, the invention comprises the treatment of fruits, particularly oranges, with a powdered water insoluble, oil soluble dye under such circumstances that the dye is uniformly dissolved in a surface film of solvent or dispersing medium preliminarily applied to the fruit.

As has been indicated hereinbefore, the typical method of dyeing citrus fruits comprises the immersion of the fruit in a dye bath. This dye bath itself comprises a water insoluble, oil soluble dye dissolved in a solvent. According to proposals in the past the solvent dye phase may be continuous or it may constitute a discontinuous phase by being emulsified in water with suitable emulsifying agents. In either case, the fruit is immersed in and contacted by an excessive amount of a solvent for the oily and waxy constituents of the fruit. In these circumstances, therefore, excess leaching or removal of the natural preserving agents of the skin obtain.

According to the present method a suitable certified water insoluble, oil soluble dye is employed in dry powdered form and this is applied to a fruit, such as an orange, which has been subjected to such a preliminary treatment that the fruit itself contains a thin extenuated film of solvent or dispersing medium. In these circumstances, therefore, the fine dye particles are dusted on or applied to the film of solvent or dispersing medium and are dissolved or dispersed uniformly through the film. Since the film is of such character that it has a penetrating or dissolving action on the skin, the dye is thus carried into and transferred to the peel of the fruit. With this type of operation a minimal quantity of the solvent or dispersing agent may be employed, thus limiting to a considerable degree the amount of solubilizing and removal of the oily and waxy constituents of the fruit.

In operating the invention the fruit, such as oranges, may be subjected to a preliminary treatment, as for example by immersion in a cleaning or detergent solution. This may be effected in the well known manner by utilizing apparatus now available in the art. From the washing tank the oranges may be passed, either continuously or intermittently, to a rinsing tank to remove any adherent washing solution. The thus washed and rinsed fruit is then passed through a tank containing a solvent for the dye which is to be employed. Such solvent may comprise any suitable organic solvent for the dye, such as light hydrocarbon fractions, alcohols, ketones, vegetable oils and the like.

The oranges or other fruit which are immersed in the dye bath may rapidly be removed therefrom by suitable conveying mechanism and passed over a series of transverse rollers whereon they are rapidly rotated to establish a continuous thin film of the solvent over the surface of the fruit. When such thin film has been established the fruit may be passed into and through a dye applicator. In this element dry powdered dye is deposited on the fruit and preferably while the latter is substantially continuously rotated. The dye may be applied to the skin of the fruit by means of a suitable sifting mechanism. In these circumstances the fine particles of dye deposit on and adhere to the liquid film on the skin of the fruit. The dye then is dissolved and/or dispersed through this film and is diffused or otherwise transferred to the epidermis of the fruit to deposit thereon.

After treatment in the dye applicator the treated fruit may be removed and subjected to a buffing action to mechanically work the liquid film, containing the dissolved or dispersed dye, into the skin. Thereafter the fruit may be rinsed with water to remove excess dye and may be subjected to any suitable type of treatment. Thus the fruit which has been dyed in the manner described may be passed into a tank containing a wax emulsion so as to deposit the desired quantity of wax on the peel, and such waxed fruit may thereafter be polished in the manner well known in the art.

In another method of operation the fruit, such as oranges, may be washed with the detergent solution and then passed into a tank containing an aqueous soap solution maintained at relatively elevated temperatures of the order of from 80 to 120° F. or more. The fruit may be maintained in the soap solution for a relatively short period of time or for a prolonged period of time. If the treatment in the soap solution is of short duration, the solution acts upon the waxy constituents of the skin to remove such waxy constituents to some extent and to thus permit more rapid penetration of the dye. After a short treatment in the soap solution the oranges are removed and passed over a series of conveyor rolls to the dye applicator. The fruit entering the dye application, as will be appreciated, is covered with a thin film of the soap solution. The dry powdered dye is applied uniformly to the fruit and preferably while the latter is rapidly rotated so as to insure a uniform deposition of dye on the film. The thus applied dye adheres to the film and is taken up and dispersed therethrough. During the mechanical working action effected by the rollers the dispersed dye is transferred to and deposited in the peel of the fruit.

After treatment in the dye applicator the oranges may be treated, as by rinsing with water, to remove excess dye and may then be passed to a waxing tank and dried and polished in the manner well known to those skilled in the art.

In another method of operation the oranges, which may first be subjected to a preliminary cleaning, as by a detergent solution, are passed into a tank containing a solvent or soap solution maintained at relatively elevated temperatures. The oranges may be retained in this tank for a period of time sufficiently prolonged to insure substantially complete removal of the oily or waxy constituents. This period of contact, as will be appreciated, will vary depending upon the particular type of solvent or soap solution employed, the concentration of the solution and the temperature. After treatment in this dewaxing tank the oranges, now substantially completely denuded of the waxy layer and containing a thin extenuated film of solvent or soap solution, are passed through the dye applicator in the manner hereinbefore described. In this particular operation, since the repellent waxy constituents have largely been removed, the dye contained either in the solvent or soap vehicle rapidly penetrates and is deposited in the peel of the fruit. After such dyeing operation the oranges may be rinsed, waxed, dried and polished, or subjected to any other desired type of subsequent treatment.

It will be understood that the essential treatment according to the present invention involves the use of a dry dye and the establishment of a thin film of liquid on the surface of the fruit, which film of liquid presents the capability of absorbing the dye and transferring it to the peel of the fruit. This type of operation therefore avoids the necessity of using a dye bath containing large amounts of solvent and permits a more accurate control of the tinctorial effect of the dye treatment.

It will be understood that within the scope of the invention various modified processes may be employed. Thus, if desired, the fruit to be treated may be dewaxed in one tank with one type of solvent, may then be rinsed and then immersed in or sprayed by yet another type of solvent which has a preferential solubilizing action upon the dye to be employed. With this type of treatment, therefore, optimum conditions of washing, partial or complete dewaxing or dyeing may be established.

While preferred modifications of the invention have been described, it is to be understood that these are given as exemplifying the underlying principles involved and not as limiting the invention to these particular methods.

I claim:

1. A process of enhancing the varietal color of whole citrus fruit which comprises washing the fruit, applying to the skin of the washed fruit a thin continuous film of an aqueous soap solution, applying to the fruit a quantity of dry powdered oil soluble, water insoluble dye which is dispersable by said soap solution.

2. A process of enhancing the varietal color of whole citrus fruit which comprises applying to the skin of the fruit a thin film of an aqueous soap solution, uniformly depositing on such liquid film a dry powdered water insoluble, oil soluble dye, washing the fruit to remove excess dye and then waxing and polishing the fruit.

3. A process of enhancing the varietal color of whole citrus fruit which comprises washing the fruit, applying to the skin of the washed fruit a thin continuous film of an aqueous soap solution, applying to the fruit a quantity of dry powdered oil soluble, water insoluble dye which is dispersable by said soap solution, washing the fruit to remove excess dye, and subsequently waxing the dyed fruit.

DAVID G. ULREY.